(12) United States Patent
da Silva et al.

(10) Patent No.: US 11,284,281 B2
(45) Date of Patent: Mar. 22, 2022

(54) METHOD AND APPARATUS FOR CHARGING DIFFERENTIATION IN A WIRELESS COMMUNICATION NETWORK USING AGGREGATED RADIO ACCESS

(71) Applicant: Telefonaktiebolaget LM Ericsson (publ), Stockholm (SE)

(72) Inventors: Icaro L. J. da Silva, Bromma (SE); Filip Mestanov, Sollentuna (SE); Oumer Teyeb, Solna (SE); Jari Vikberg, Järna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 415 days.

(21) Appl. No.: 15/761,839

(22) PCT Filed: Sep. 23, 2015

(86) PCT No.: PCT/SE2015/050996
§ 371 (c)(1),
(2) Date: Mar. 21, 2018

(87) PCT Pub. No.: WO2017/052432
PCT Pub. Date: Mar. 30, 2017

(65) Prior Publication Data
US 2018/0262930 A1    Sep. 13, 2018

(51) Int. Cl.
*H04M 15/00* (2006.01)
*H04L 12/14* (2006.01)
(Continued)

(52) U.S. Cl.
CPC ............. *H04W 24/08* (2013.01); *H04L 12/14* (2013.01); *H04L 12/1403* (2013.01);
(Continued)

(58) Field of Classification Search
CPC ........ H04W 24/08; H04W 4/24; H04L 12/14; H04L 12/1403; H04L 12/1407; H04M 15/81
See application file for complete search history.

(56) References Cited

U.S. PATENT DOCUMENTS 8,306,882 B1   11/2012   Mangal
9,141,947 B1    9/2015   Furr et al.
(Continued)

FOREIGN PATENT DOCUMENTS

CN    102137136 A    7/2011

OTHER PUBLICATIONS

Unknown, Author, "3rd Generation Partnership Project; Technical Specification Group Services and System Aspects; Policy and charging control architecture (Release 13)", 3GPP TS 23.203 V13.2.0, Dec. 2014, 230 pages.
(Continued)

*Primary Examiner* — Faruk Hamza
*Assistant Examiner* — Abusayeed M Haque
(74) *Attorney, Agent, or Firm* — Murphy, Bilak & Homiller, PLLC (57) ABSTRACT

The teachings presented herein disclose example methods and apparatuses for differentiating charging with respect to an aggregated radio access. In this context, an "aggregated radio access" aggregates two or more different radio accesses, such as two or more different carriers, for conveying user traffic between a wireless communication network and a user device. The ability to discount charges, apply premium billing, or to otherwise track and bill usage at a granularity level below the aggregated radio access—i.e., on a per access basis—allows the involved network operator(s) to offer discounts, apply premium pricing, etc.

15 Claims, 8 Drawing Sheets

(51) Int. Cl.
*H04W 88/06* (2009.01)
*H04W 4/24* (2018.01)
*H04W 24/08* (2009.01)

(52) U.S. Cl.
CPC ....... *H04M 15/44* (2013.01); *H04M 15/8044* (2013.01); *H04W 4/24* (2013.01); *H04W 88/06* (2013.01)

(56) References Cited

U.S. PATENT DOCUMENTS

| | | | |
|---|---|---|---|
| 2002/0013841 A1* | 1/2002 | Schweitzer | G06Q 30/02 709/224 |
| 2009/0180451 A1* | 7/2009 | Alpert | H04W 72/1215 370/338 |
| 2011/0167150 A1* | 7/2011 | Riley | H04L 12/1407 709/224 |
| 2012/0096513 A1* | 4/2012 | Raleigh | H04W 8/18 726/1 |
| 2012/0109800 A1* | 5/2012 | Zhou | H04M 15/765 705/34 |
| 2014/0198647 A1* | 7/2014 | Chowdhury | H04L 67/1044 370/235 |
| 2014/0198687 A1* | 7/2014 | Raleigh | G06Q 30/04 370/259 |
| 2015/0133081 A1* | 5/2015 | Griot | H04M 15/00 455/407 |
| 2015/0236914 A1* | 8/2015 | Woods | H04L 12/1407 370/230 |
| 2015/0256561 A1* | 9/2015 | Zhou | H04L 65/1069 370/328 |
| 2015/0304196 A1* | 10/2015 | Sun | H04N 21/64322 709/219 |
| 2016/0366061 A1* | 12/2016 | Renzullo | H04L 45/304 |
| 2017/0104633 A1* | 4/2017 | Wen | H04L 41/0896 |
| 2018/0159725 A1* | 6/2018 | Goermer | H04M 15/64 |
| 2018/0176800 A1* | 6/2018 | Sunay | H04W 72/04 |

OTHER PUBLICATIONS

Unknown, Author, "LTE-WLAN aggregation", 3GPP TSG-RAN WG2 #89bis, Tdoc R2-151438, Bratislava, Slovakia, Apr. 20-24, 2015, 1-7.

* cited by examiner

METHOD AND APPARATUS FOR CHARGING DIFFERENTIATION IN A WIRELESS COMMUNICATION NETWORK USING AGGREGATED RADIO ACCESS

TECHNICAL FIELD

The present invention generally relates to wireless communication networks that use aggregated radio access and particularly relates to differentiating charging with respect to aggregated radio access.

BACKGROUND

The phrase "aggregated radio access" is used herein to denote cases where two or more different radio accesses are used to convey the user traffic between a wireless communication network and a user device. In turn, the phrase "radio access" does not connote a particular event or transmission, but rather is used as a noun to connote the way or means of communicative coupling between a wireless device and the communication network. The term "radio access" as used herein thus refers to the means by which the user device and the communication network are communicatively connected.

Merely by way of non-limiting example, an aggregated radio access is based on aggregating two or more carriers, where each such carrier comprises one or more waveforms that are modulated or otherwise manipulated to convey information. For example, a given aggregated radio access aggregates a first carrier as a first radio access together with a second carrier as a second radio access, and any one or more of the following distinctions apply: the first carrier is associated with a first Radio Access Technology, RAT, and the second carrier is associated with a second RAT different than the first RAT; the first carrier is operated in a licensed radio spectrum associated with the wireless communication network and the second carrier is operated in an unlicensed spectrum; and the first carrier is owned or controlled by a first network operator and the second carrier is owned or controlled by a second network operator different than the first network operator.

The above scenarios map to any number of practical examples, such as the use of License Assisted Access, LAA, in the LTE context. LAA aggregates primary and secondary carriers together, to provide higher data rates or improved coverage to a wireless device. The primary carrier is operated in licensed spectrum associated with the LTE network and the secondary carrier is operated in unlicensed spectrum, e.g., in the unlicensed 2-5 GHz spectrum used by Wi-Fi networks and many other unlicensed devices and systems.

In another example, a cellular communication network provides connectivity between a wireless device and the Internet or another packet data network. The cellular communication network includes a Core Network, CN, portion that provides top-level packet routing to and from the wireless device, and a RAN portion that provides radio connectivity to the wireless device. In this scenario, the cellular network may use an aggregated radio access for serving the wireless device, where the RAN portion of the cellular network provides one radio access and a Wi-Fi Access Point, AP, provides another radio access.

Aggregated access allows, for example, user traffic to be split between two or more different radio accesses, e.g., between a radio link(s) provided by a cellular RAN and a radio link provided by a Wi-Fi AP. The Technical Reference TR 36.808 promulgated by the Third Generation Partnership Project, 3GPP, provides exemplary details for carrier aggregation in the context of networks based on the Long Term Evolution Advanced, LTE-Advanced, specifications.

SUMMARY

The teachings presented herein disclose example methods and apparatuses for differentiating charging with respect to an aggregated radio access. In this context, an "aggregated radio access" aggregates two or more different radio accesses, such as two or more different carriers, for conveying user traffic between a wireless communication network and a user device. The ability to discount charges, apply premium billing, or to otherwise track and bill usage at a granularity level below the aggregated radio access—i.e., on a per access basis—allows the involved network operator(s) to offer discounts, apply premium pricing, etc.

In an example embodiment, a method of operation in a control node configured for operation in a wireless communication network includes monitoring a division of user traffic in a user traffic flow for which an aggregated radio access is used. The aggregated radio access divides the user traffic between two or more different radio accesses used to convey the user traffic between the wireless communication network and a user device, and the method includes accumulating usage data reflecting the division while the user traffic flow is active, based on the monitoring, and transmitting the usage data to a further node in the wireless communication network, for use in differentiating charging with respect to the aggregated radio access.

In another example embodiment, a control node is configured for operation in a wireless communication network and includes one or more communication interfaces and processing circuitry operatively associated with the one or more communication interfaces. The one or more communication interfaces are configured to exchange signaling with a further node in the wireless communication network and the processing circuitry is configured to monitor a division of user traffic in a user traffic flow for which an aggregated radio access is used. As before, the aggregated radio access divides the user traffic between two or more different radio accesses used to convey the user traffic between the wireless communication network and a user device. The processing circuitry is further configured to accumulate usage data reflecting the division while the user traffic flow is active, based on the monitoring, and transmit the usage data to the further node, for use in differentiating charging with respect to the aggregated radio access.

In yet another example embodiment, a method of operation in a gateway node is configured for operation in a wireless communication network and includes determining that differentiated charging with respect to an aggregated radio access shall be used for a user traffic flow supported by the gateway node. The aggregated radio access divides user traffic comprising the user traffic flow between two or more different radio accesses connecting the wireless communication network to a user device associated with the user traffic flow. The method further includes receiving usage data accumulated by a control node associated with a Radio Access Network, RAN, portion of the wireless communication network, reflecting the division of the user traffic with respect to the aggregated radio access. Still further, the method includes generating a Charging Data Record, CDR, that differentiates usage with respect to the aggregated radio access, based on the usage data, and transmitting the CDR to a charging system node, for use in differentiated billing with respect to the aggregated radio access.

In a related, further embodiment, a gateway node is configured for operation in a wireless communication network. The gateway node includes one or more communication interfaces configured to exchange signaling with a control node associated with a RAN portion of the wireless communication network. Further, the gateway node includes processing circuitry that is operatively associated with the one or more communication interfaces. More particularly, the processing circuitry is configured to determine that differentiated charging with respect to an aggregated radio access shall be used for a user traffic flow supported by the gateway node, where the aggregated radio access divides user traffic comprising the user traffic flow between two or more different radio accesses connecting the wireless communication network to a user device associated with the user traffic flow. The processing circuitry is further configured to receive usage data accumulated by the control node, reflecting the division of the user traffic with respect to the aggregated radio access, generate a CDR that differentiates usage with respect to the aggregated radio access, based on the usage data, and transmit the CDR to a charging system node, via the one or more communication interfaces, for use in differentiated billing with respect to the aggregated radio access.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
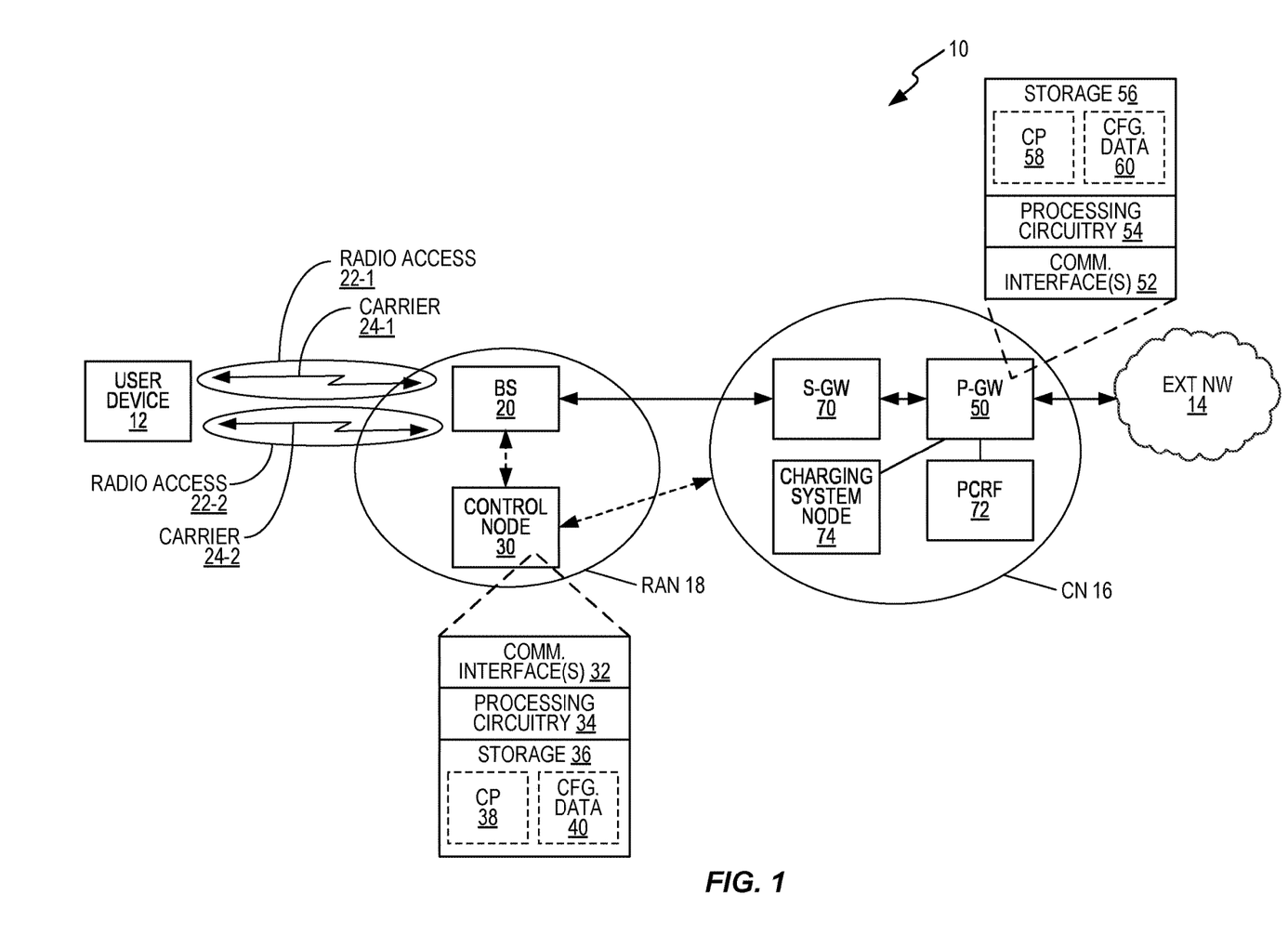
FIG. 1 is a block diagram of one embodiment of a wireless communication network that at least selectively uses aggregated radio access.

FIG. 1 is a block diagram of one embodiment of a wireless communication network 10 that at least selectively uses aggregated radio access. The aggregated access involves two or more different radio accesses—e.g., two or more different carriers or other radio connections that may involve different Radio Access Technologies or RATs, and may involve different Radio Access Networks or RANs.

In the non-limiting example of FIG. 1, the wireless communication network 10—hereafter "network 10"—communicatively couples a user device 12 to one or more external networks 14. While only one user device 12 appears in the diagram, in practice the network 10 may couple a potentially large number of wireless devices 12 to the external network(s) 14, such as the Internet. The network 10 includes a Core Network or CN 16 and a RAN 18, and in the illustrated example the RAN 18 includes a base station 20 that provides two different radio accesses 22, for wirelessly connecting the user device 12 to the network 10.

In particular, the diagram illustrates a first radio access 22-1 and a second radio access 22-2. The first radio access 22-1 is defined by or otherwise provided by means of a first carrier 24-1. Similarly, the second radio access 22-2 is defined by or otherwise provided by means of a second carrier 24-2. When suffixes are not needed for clarity, the reference numbers "22" and "24" is used in the singular and plural senses. Thus, it should be understood that two or more different radio accesses 22 are aggregated to provide an aggregated radio access, and that the use of two or more different carriers 24 is one mechanism for providing multiple radio accesses 22 for connecting a user device 12 to the network 10.

The base station 20 includes or is at least communicatively coupled to a control node 30, which includes one or more communication interfaces 32, processing circuitry 34 and storage 36, which stores a computer program 38 and configuration data 40, for example. The term "communication interface" shall be understood as denoting the physical layer connection circuits and associated protocol processing and control circuits, as needed to communicate over a particular type of communication link, which may be a wired link or a wireless link. In the example illustration, the control node 30 is communicatively coupled to the base station 20 and to one or more nodes in the CN 16 via its communication interface(s) 32.

The processing circuitry 34 is operatively associated with the communication interface(s) 32, e.g., for sending and receiving information via the communication interface(s) 32, and comprises fixed circuits, programmed circuits, or a mix of fixed and programmed circuits. In an example embodiment, the processing circuitry 34 at least in part comprises one or more microprocessors, or Digital Signal Processors, or Field Programmable Gate Arrays, or Application Specific Integrated Circuits, or other digital processing circuits that are specially adapted or configured to carry out the functional processing disclosed herein, based on the execution of computer program instructions comprising the computer program 38.

To that end, the storage 36 comprises one or more types of computer-readable media, such as FLASH, EEPROM, Solid State Disk, SRAM, DRAM, etc., that provides non-transitory storage for the computer program 38. Here, "non-transitory" storage does not necessarily mean permanent or unchanging storage, but does connote storage of at least some persistence, e.g., for later retrieval. In an example embodiment, the storage 36 includes non-volatile storage for longer-term program storage and volatile storage for program execution, working data, etc.

The CN 16 as illustrated includes a Packet Gateway or P-GW 50 that provides connectivity into and out of the network 10, and thus serves as the gateway for communication exchanges between user devices 12 operating in the network 10 and devices or systems reachable through the external network(s) 14. The P-GW 50 includes one or more communication interfaces 52, processing circuitry 54 and storage 56, which stores a computer program 58 and configuration data 60, for example. The term "communication interface" shall be understood as denoting the physical layer connection circuits and associated protocol processing and control circuits, as needed to communicate over a particular type of communication link. In the example illustration, the P-GW 50 is communicatively coupled to one or more Serving Gateways or S-GWs 70, a Policy and Charging Rules Function or PCRF node 72, and a charging system node 74. The CN 16 may include additional nodes not shown, or may comprise an alternative arrangement of nodes.

The processing circuitry 54 of the P-GW 50 is operatively associated with the communication interface(s) 52, e.g., for sending and receiving information via the communication interface(s) 52, and comprises fixed circuits, programmed circuits, or a mix of fixed and programmed circuits. In an example embodiment, the processing circuitry 54 at least in part comprises one or more microprocessors, or Digital Signal Processors, or Field Programmable Gate Arrays, or Application Specific Integrated Circuits, or other digital processing circuits that are specially adapted or configured to carry out the functional processing disclosed herein, based on the execution of computer program instructions comprising the computer program 58.

To that end, the storage 56 comprises one or more types of computer-readable media, such as FLASH, EEPROM, Solid State Disk, SRAM, DRAM, etc., that provides non-transitory storage for the computer program 58. Here, "non-transistory" storage does not necessarily mean permanent or unchanging storage, but does connote storage of at least some persistence, e.g., for later retrieval. In an example embodiment, the storage 56 includes non-volatile storage for longer-term program storage and volatile storage for program execution, working data, etc.

With the above non-limiting implementation examples in mind, the control node 30 in one or more embodiments is configured for operation in a wireless communication network, such as the network 10 and its one or more communication interfaces 32 are configured to exchange signaling with at least one further node in the network 10. In FIG. 1, for example, the communication interface(s) 32 communicatively couple the control node 30 to the base station 20 and to the P-GW 50 in the CN 16.

Note that these couplings may be direct as between the control node 30 and each further node, or they may be indirect couplings, where the signaling is conveyed through one or more intervening nodes. For example, the control node 30 in at least some embodiments is integrated in or co-located with a LTE radio node or base station, denoted as an "eNB" in the 3GPP lexicon. In that example case, the signaling path may be eNB→MME→S-GW→P-GW, or eNB→S-GW→P-GW. Here, "MME" denotes a Mobility Management Entity in the CN 16. Among other things, MMES provide mobility tracking, paging, and bearer activation and deactivation support.

The processing circuitry 34 is operatively associated with the one or more communication interfaces 32 and in an example embodiment the processing circuitry 34 is configured to monitor a division of user traffic in a user traffic flow for which an aggregated radio access is used. In this disclosure, an "aggregated radio access" is the aggregation of two or more radio accesses 22. The different radio accesses 22 can be provided by the same RAN using the same RAT, or can involve different RANs and/or different RATs. In the illustrated example, the RAN 18 provides the first radio access 22-1 via a first carrier 24-1 and provides the second radio access 22-2 via a second carrier 24-2.

As a general proposition, an aggregated radio access divides the user traffic in a given user traffic flow between two or more different radio accesses 22. A "user traffic flow" comprises, in one example, a sequence of data packets flowing between a device or system in the external network (s) 14 and a user device 12. A user traffic flow may be associated with, for example, multimedia or streaming services, and more generally with essentially any type of communications session or service. It should also be noted that an aggregated radio access may at certain times or in certain instances constrain all of the user traffic for the flow to only one of the two or more radio accesses 22 that are involved in the aggregation. At other times or in other instances, the user traffic flow is split among two or more of the radio accesses 22 involved in the aggregation. The split may be static or may be dynamically adjusted, and the split may or may not be equal among the radio accesses 22.

The processing circuitry 34 is further configured to accumulate usage data reflecting the division of user traffic between or among the radio accesses 22, while the user traffic flow is active. The accumulation functionality is based on the aforementioned monitoring by the processing circuitry 34, and the processing circuitry 34 is further configured to transmit the usage data to the further node, e.g., the P-GW 50, for use in differentiating charging with respect to the aggregated radio access.

By way of example, the two or more different radio accesses 22 comprise two or more different carriers 24 that are aggregated to support the aggregated radio access. In such an example, the processing circuitry 34 is configured to monitor the division of the user traffic by monitoring a division of the user traffic between the two or more different carriers 24. The two or more different carriers 24 comprise at least one of: a first carrier 24-1 associated with a first RAT and a second carrier 24-2 associated with a second RAT different than the first RAT; a first carrier 24-1 operated in a licensed radio spectrum associated with the network 10 and a second carrier 24-2 operated in an unlicensed spectrum; and a first carrier 24-1 owned or controlled by a first network operator and a second carrier 24-2 owned or controlled by a second network operator different than the first network operator. Use of License Assisted Access or LAA in a LTE embodiment of the network 10 is a non-limiting example of licensed/unlicensed carrier aggregation.

In one example of aggregated radio access, the user traffic flow in question comprises an Internet Protocol, IP, packet flow. The processing circuitry 34 of the control node 30 is configured to monitor the division of the user traffic in the user traffic flow by monitoring a division of the IP packets comprising the user traffic flow between the two or more different radio accesses 22.

The network 10 in one or more embodiments uses an instance of a defined radio protocol stack for exchanging the user traffic with the user device 12 and the processing circuitry 34 is configured to monitor the division of the user traffic in the user traffic flow, based on one of the following configurations being applicable: two or more different radio accesses 22 involved in the aggregation do not share at least a portion of the same instance of the radio protocol stack; and two or more different radio accesses 22 involved in the aggregation share at least a portion of the same instance of the radio protocol stack.

The LTE radio protocol stack provides a helpful working example, and includes a Physical or PHY layer at the bottom of the stack. In ascending order comes the Medium Access Control or MAC layer, the Radio Link Control or RLC layer, and the Packet Data Convergence Protocol or PDCP layer. In an example implementation, the user traffic flow in question is split below the PDCP layer and the monitoring of the traffic split occurs below the PDCP layer. In such cases, and in certain other instances, it is advantageous for the involved serving base station 20 to incorporate the control node 30. That is, it is contemplated herein that the functionality and operation described herein for the control node 30 be incorporated into individual base stations 20 within the network 10. In such cases, a serving base station 20 may provide the different radio accesses 22 involved in the aggregation.

However, even in instances where the user traffic flow is split at some level within the radio protocol stack, the control node 30 may be implemented apart from the involved base station(s) 20. Further, in other circumstances, the user traffic flow is split above the radio protocol stack, e.g., it is split for conveyance through two different RANs.

Regardless of the location of the split or the details surrounding the splitting of user traffic, in at least some embodiments, the processing circuitry 34 is configured to monitor the division of the user traffic in the user traffic flow by monitoring absolute amounts of the user traffic conveyed via each of the two or more different radio accesses 22. Correspondingly, the usage data transmitted by the control node 30 to the P-GW 50 or other node(s) in the network 10 indicates the absolute amounts of the user traffic conveyed via each of the two or more different radio accesses 22.

In another example, the processing circuitry 34 is configured to monitor the division of the user traffic in the user traffic flow by monitoring relative amounts of the user traffic conveyed via each of the two or more different radio accesses 22. Correspondingly, the usage data transmitted to the further node(s) in the network 10 indicates the relative amounts of the user traffic conveyed via each of the two or more different radio accesses 22. For example, the control node 30 transmits percentage or ratio values indicating the traffic split between the different radio accesses 22.

In the same or in other embodiments, the processing circuitry 34 is configured to monitor one or more Quality-of-Service, QoS, parameters for each of the two or more different radio accesses 22 involved in the aggregation and to include an indication of the monitored QoS parameters, or data derived therefrom, in the usage data transmitted to the further node(s) in the network 10, for further differentiation of charging with respect to the aggregated radio access.

Figure 2:
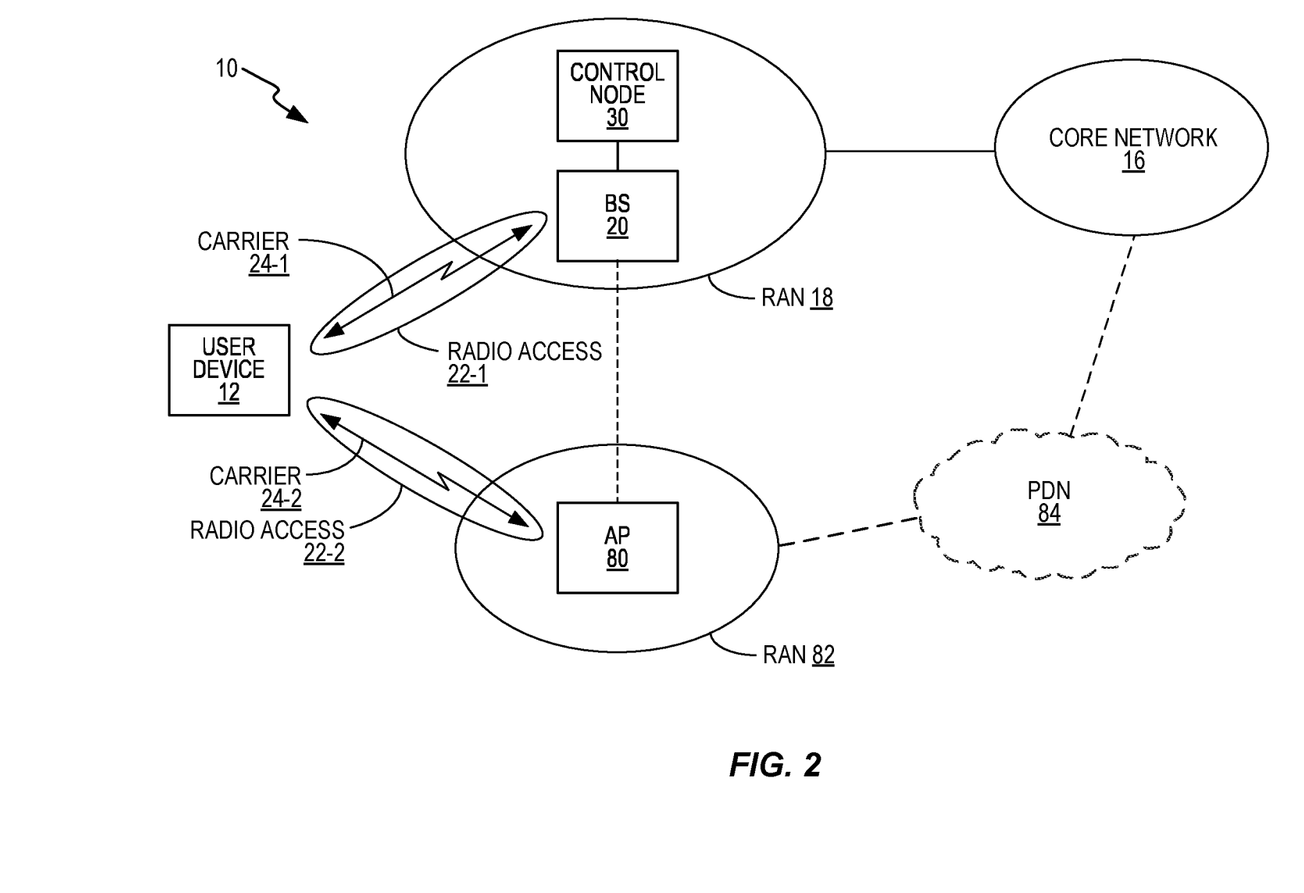
FIG. 2 is a block diagram of another embodiment of a wireless communication network that at least selectively uses aggregated radio access.

FIG. 2 illustrates another example aggregation scenario. Here, the network 10 comprises a cellular communication network and a first one 22-1 of the two or more different radio accesses 22 involved in an aggregation is a first carrier 24-1 provided by a radio base station 20 of the cellular communication network. A second one 22-2 of the two or more different radio accesses 22 is a second carrier 24-2 provided by a Wireless Local Access Network, WLAN, access point 80 in a RAN 82. The access point 80 may be coupled to the base station 20 in the RAN 18, or may be coupled to the CN 16 via a Packet Data Network or PDN 84, or may be coupled to both the RAN 18 and to the CN 16. In at least one embodiment, the base station 20 and the access point 80 are communicatively coupled for traffic splitting and control coordination. Correspondingly, in at least one such embodiment, the control node 30 is be integrated in or communicatively coupled to the base station 20, for monitoring how the user traffic flow is split between the two RANs 18 and 82.

The P-GW 50 as contemplated herein is configured to complement operation of the control node or nodes 30 operating within the network 10, and to advantageously use the usage data accumulated by such control node(s) 30. In an example embodiment, the one or more communication interfaces 52 of the P-GW 50 are configured to exchange signaling with one control node 30 associated with the RAN portion 18 of the network 10. Note that the P-GW 50 may communicate with multiple control nodes 30, e.g., where individual control nodes 30 are integrated in or otherwise associated with respective base stations 20 or groups of base stations 20 within the RAN 18.

The processing circuitry 54 of the P-GW 50 is operatively associated with the one or more communication interfaces 52 and configured to determine that differentiated charging with respect to an aggregated radio access shall be used for a user traffic flow supported by the P-GW 50. In a non-limiting example, the processing circuitry 54 determines that differentiated charging is to be used, based on signaling exchanged between the PCRF node 72 and the P-GW 50.

The aggregated radio access divides user traffic comprising the user traffic flow between two or more different radio accesses 22 connecting the network 10 to a user device 12 associated with the user traffic flow and the processing circuitry 54 is further configured to receive usage data accumulated by the control node 30, reflecting the division of the user traffic with respect to the aggregated radio access. Still further, the processing circuitry 54 is configured to generate a Charging Data Record, CDR, that differentiates usage with respect to the aggregated radio access, based on the usage data, and to transmit the CDR to a charging system node 74, via the one or more communication interfaces 52, for use in differentiated billing with respect to the aggregated radio access.

In one or more example embodiments, or in example instances, the usage data from the control node 30 indicates the division of the user traffic between the two or more different radio accesses 22. For example, the usage data comprises a percentage value or a ratio value, indicating the traffic split between or among the different radio accesses 22 involved in the aggregation. Correspondingly, the processing circuitry 54 is configured to generate the CDR by calculating an absolute amount of usage for each of the two or more different radio accesses 22, based on the indicated division and an aggregate amount of the user traffic conveyed via the aggregated radio access. The processing circuitry 54 may track or monitor the aggregate amount of the user traffic, or may receive that information from another node.

In another embodiment, or in another example case, the control node 30 provides the usage data in the form of absolute amounts of traffic, for the involved radio accesses 22. The processing circuitry 54 may be configured to work with both types of accumulated usage data, e.g., relative and absolute indications, to accommodate different reporting formats, different control node capabilities, etc. In the same or in other embodiments, the usage data further includes QoS information for the two or more different radio accesses 22, and the processing circuitry 54 is configured to generate the CDR further to reflect the QoS information, for further differentiation of charging with respect to the aggregated radio access.

In at least some embodiments, the processing circuitry 54 is configured to send, via the one or more communication interfaces 52, a message such as a Credit Control Request, CCR, to the PCRF 72, in response to receiving a request to create a session to support a user traffic flow, and to determine that differentiated charging with respect to aggregated radio access shall be used for the user traffic flow, based on receiving an indication from the PCRF node 72 in response to the CCR. Other message types also may be used to control aggregated radio access and/or to report differentiated usage information for aggregated radio accesses.

Further, in a related example scenario, the user traffic flow in question is a first user traffic flow, and, with respect to a second user traffic flow, the processing circuitry 54 is configured to: determine that a default charging shall be used for the second user traffic flow, which default charging does not differentiate with respect to any use of an aggregated radio access for the second user traffic flow; accumulate usage data for the second user traffic flow while the second user traffic flow is active; generate a CDR for the second user traffic flow based on the accumulated usage data; and send the CDR to the charging system node 74. Thus, the P-GW 50 may or may not differentiate charging for aggregated radio accesses, e.g., based on the applicable policies or charging rules information provided by the PCRF node 72.

Figure 3:
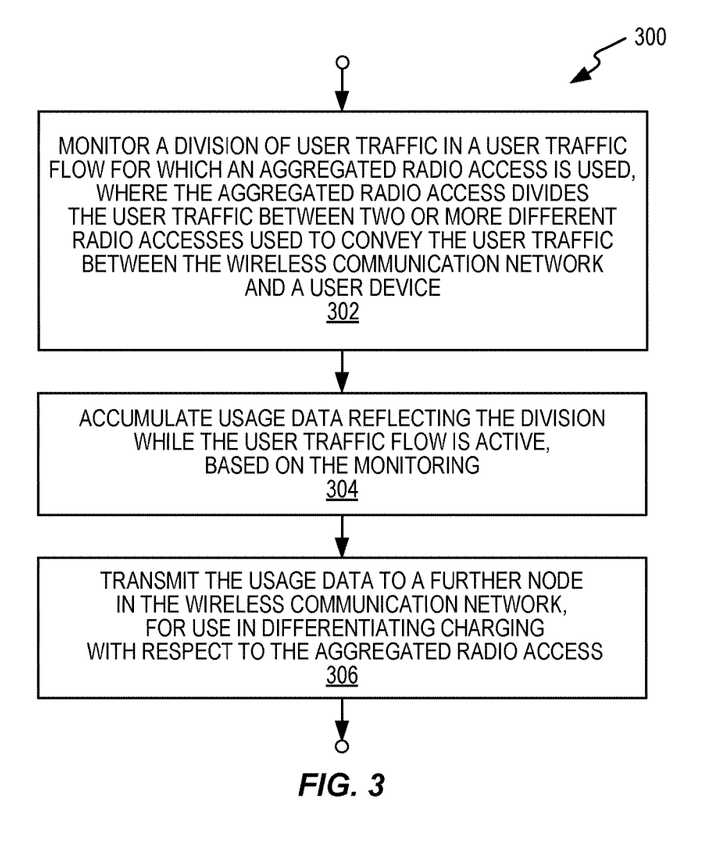
FIG. 3 is a logic flow diagram of one embodiment of a method of processing at a control node, for charging differentiation with respect to an aggregated radio access.
Figure 4:
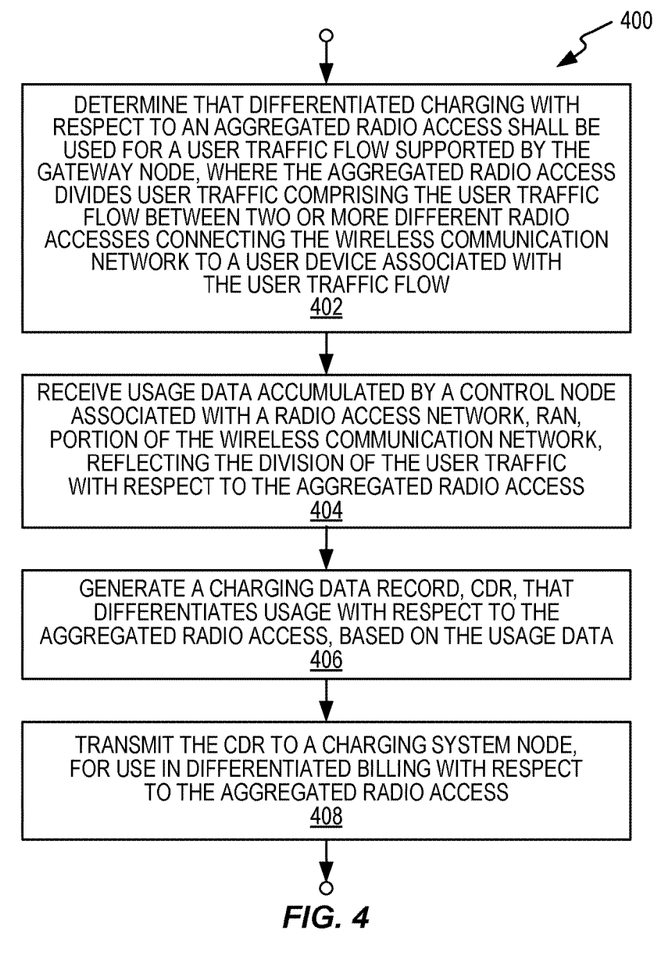
FIG. 4 is a logic flow diagram of one embodiment of a method of processing at a gateway node, for charging differentiation with respect to an aggregated radio access.

FIG. 3 illustrates one embodiment of a method 300 of processing at a control node 30, while FIG. 4 illustrates one embodiment of a complementary method 400 of processing at a gateway node, e.g., at the P-GW 50 in the network 10. In an example embodiment, the method 300 is implemented in a control node 30, based on the execution of corresponding computer program instructions by the processing circuitry 34 of the control node 30. Such instructions are included in the computer program 38, for example. Likewise, in an example embodiment, the method 400 is implemented in the P-GW 50, based on the execution of corresponding computer program instructions by the processing circuitry 54 of the P-GW 50. Such instructions are included in the computer program 58, for example.

In more detail, the method 300 comprises monitoring (Block 302) a division of user traffic in a user traffic flow for which an aggregated radio access is used, where the aggregated radio access divides the user traffic between two or more different radio accesses 22 used to convey the user traffic between the network 10 and a user device 12. The method 300 further includes accumulating (Block 304) usage data reflecting the division while the user traffic flow is active, based on the monitoring, and transmitting (Block 306) the usage data to a further node, e.g., the P-GW 50, in the network 10, for use in differentiating charging with respect to the aggregated radio access.

The example method 400 at the corresponding gateway node comprises determining (Block 402) that differentiated charging with respect to an aggregated radio access shall be used for a user traffic flow supported by the gateway node, where the aggregated radio access divides user traffic comprising the user traffic flow between two or more different radio accesses 22 connecting the network 10 to a user device 12 associated with the user traffic flow. The method 400 further includes receiving (Block 404) usage data accumulated by a control node 30 associated with RAN portion 18 of the network 10, reflecting the division of the user traffic with respect to the aggregated radio access, generating (Block 406) a CDR that differentiates usage with respect to the aggregated radio access, based on the usage data, and transmitting (Block 408) the CDR to a charging system node 74, for use in differentiated billing with respect to the aggregated radio access.

Broadly, the contemplated control node 30 may be understood as implementing a Traffic Measurement Handling Function or TMHF that detects the occurrence of a flow or bearer split, such as between two or more access technologies and/or systems. The TMFH in one or more embodiments continuously measures the amount of traffic split per specific access technology or system for each IP flow or bearer. The measurements can be the number of packets, number of Kbytes or any measure related to the amount of traffic. The TMFH may also continuously measure a QoS metric for each access, e.g., such as tracking the achieved throughput. The detection of a bearer split by the TMFH may be based on the monitoring of associated Radio Resource Control, RRC, signaling. The TMHF may be placed at a RAN node e.g., at an eNodeB or other base station 20 where the split occurs.

In an example embodiment, the flow/bearer split occurs at the PDCP level, which means that PDCP packets can be routed to one radio access 22 or another via a Split/Routing Logic Function or SLRF. One example of this embodiment is a WLAN/LTE aggregation functionality implemented at a LTE eNodeB, where a given IP flow is converted into PDCP packets, with some of the PDCP packets being routed to the RLC entity at the eNodeB and other ones of them being routed to a co-located WLAN access point and/or to a non-collocated WLAN termination Function, WTF, placed at the WLAN AP or at an Access Controller, AC, having an interface with the eNodeB or another node in the same network that contains the eNodeB. For example, the AC may have an "Xw" interface to the eNodeB.

In this example arrangement and in the example context of downlink traffic, the IP flow is split between an LTE network and a WLAN. Correspondingly, the TMHF measures how many packets per IP flow were routed to the LTE RAN and how many were routed to the WLAN.

Another example involves the so-called "tight integration" of fifth generation, 5G, radio access and LTE access at the RAN level. With tight integration, the same PDCP entity is shared between LTE and the 5G air interface. Consequently, a given IP flow may be converted into PDCP packets, with some of them being routed to the RLC entity associated with the LTE access and some of them being routed to the RLC entity of any 5G air interface co-located with LTE access and/or the RLC entity of any non-co-located 5G air interface, where such routing is done via an inter-node interface.

Figure 5:
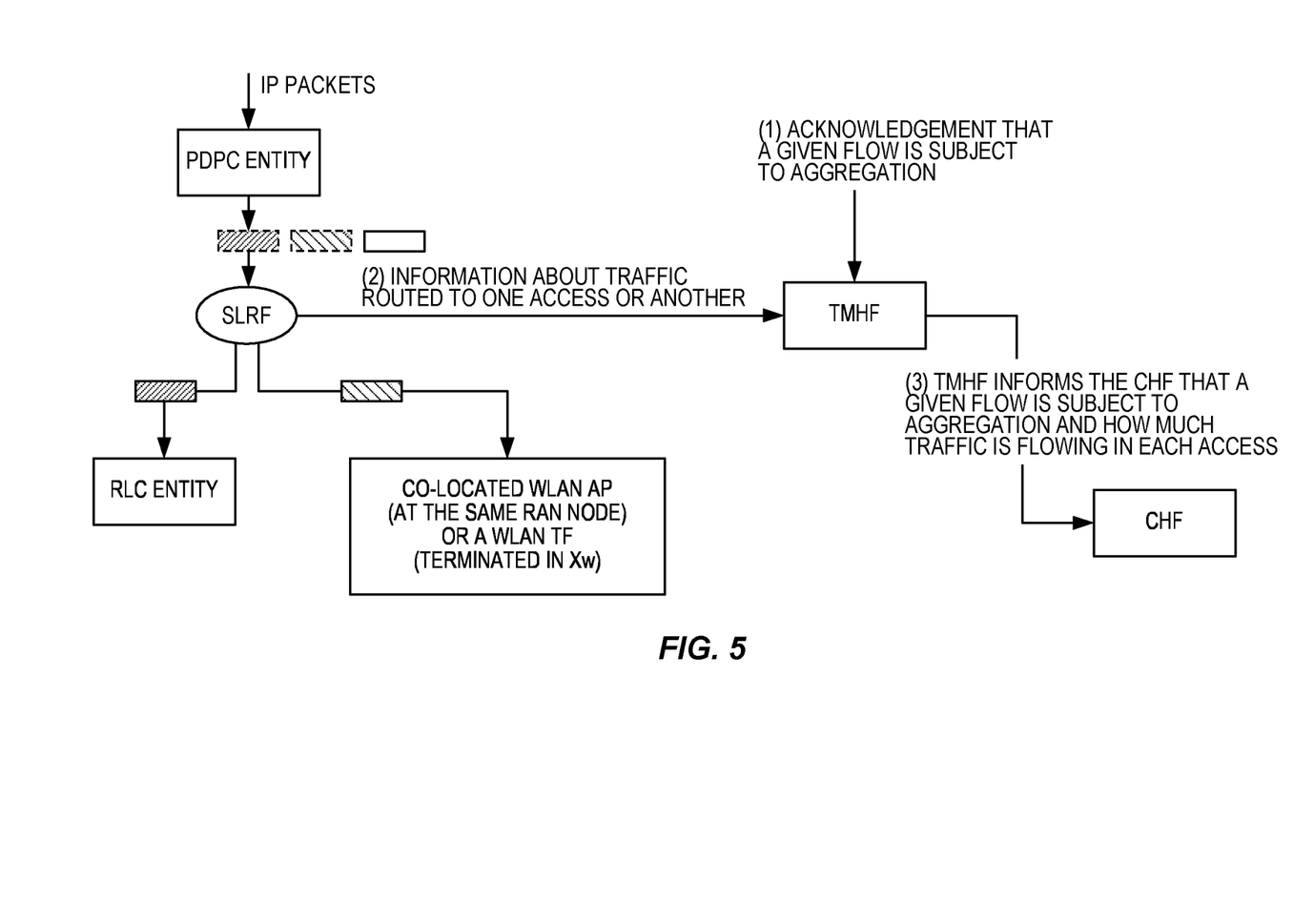
FIG. 5 is a block diagram of logical entities or functions associated with charging differentiation for aggregated radio access according to one embodiment.

FIG. 5 illustrates example TMHF operations in an example case where aggregated radio access is used for a given IP flow, such that the IP packets comprising the flow are split between an LTE access and a WLAN access. Thus, one sees downlink IP packets for the flow being processed into corresponding PDCP packets by a PDCP entity, and a SLRF dividing the PDCP packets between a RLC entity associated with the eNodeB(s) providing the LTE access and a WLAN access point or AP.

The SLRF provides the TMHF with information about how the user traffic is being split between the LTE and WLAN accesses. Correspondingly, the TMHF uses that information to inform a Charging Handling Function or CHF that the user traffic flow is subject to aggregation, and to inform the CHF regarding the amount or proportion of user traffic carried by each of the accesses. Here, the LTE access shall be understood as being a first one 22-1 of two radio accesses 22 involved in an aggregated radio access, and the WLAN access shall be understood as being a second one 22-2 of the two radio accesses 22.

The TMHF may, of course, provide functionality regarding multiple user traffic flows and for multiple user devices 12, and may store traffic splitting information on a per flow and a per device basis. The TMHF may provide corresponding reporting information to the CHF on a timed basis, on a triggered basis, or based on some combination of timed and triggered reporting. The CHF in turn creates or modifies corresponding CDRs, which CDRs reflect or account for the traffic splitting, and forwards the CDRs to an Offline Charging System or OFCS, for example.

Using terminology adopted by the Third Generation Partnership Project or 3GPP, the CHF may be understood as comprising a Policy and Charging Enforcing Function or PCEF, which can be placed at the P-GW 50 seen in FIG. 1. The P-GW 50 in one or more embodiments measures overall traffic amounts in each IP flow it handles, and charging records are created accordingly. While existing 3GPP technologies define "S5" signaling between S-GWs 70 and the P-GW 50, which enables individual S-GWs 70 to send certain traffic flow information to the P-GW 50, at least some of the embodiments disclosed herein enable RAN-level radio aggregation information to be sent to the P-GW 50. When aggregated radio access is used to support a given user traffic flow, the RAN-level radio aggregation information provided by the TMHF allows the P-GW 50 and any downstream charging or billing nodes to "see" how user traffic for a given user traffic flow was split between the two or more radio accesses 22.

Thus, at least some embodiments presented herein can be understood as enhancing existing S5 signaling sent from a S-GW 70 to the P-GW 50. That is, a control node 30 or other RAN-level node configured with the contemplated TMHF capabilities accumulates usage data reflecting the split of user traffic among or between two or more radio accesses 22 being used to provide aggregated radio access to a user device 12, and provides that usage data to the P-GW 50, e.g., by sending signaling to the involved S-GW 70. In turn, that information is received by the P-GW 50 and allows the PCEF at the P-GW 50 to create or update enhanced charging records, which are forwarded to an OFCS or other billing entities. The TMHF function is, for example, located at the RAN node where the flow is split. Notably, unless otherwise noted, the terms "flow split" and "bearer split" are used synonymously to indicate that the user traffic comprising a user traffic flow is split between two or more different radio accesses 22.

Figure 6:
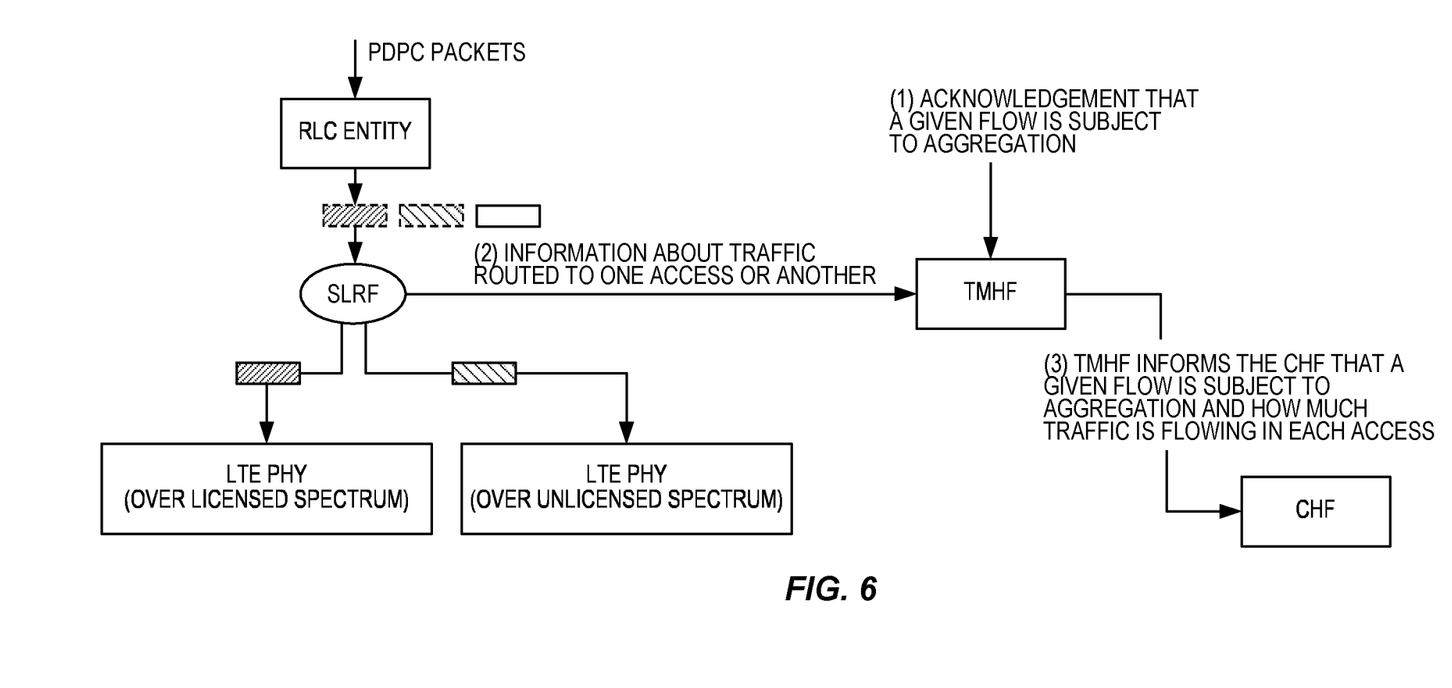
FIG. 6 is a block diagram of logical entities or functions associated with charging differentiation for aggregated radio access according to one embodiment.

In cases where the flow split occurs at the RLC or MAC level, the RLC or MAC packets are divided by a SRLF between or among the two or more different radio accesses 22 involved in the aggregation. This type of split may be used, for example, in the LTE LAA case where the split is done at the RLC layer between a licensed LTE carrier and an unlicensed LTE carrier. FIG. 6 illustrates this example case, by depicting a RLC entity within the involved eNodeB, which is not pictured.

The RLC entity receives PDCP packets and outputs corresponding RLC segments, which are then divided by the SLRF between the licensed and unlicensed carriers. That is, the involved eNodeB transmits some of the RLC segments over the licensed carrier and some of the RLC segments over the unlicensed carrier. The THMF detects, for example, that the involved bearer is subject to split transmission over licensed and unlicensed spectra, and accumulates usage data for the licensed and unlicensed carriers, which data is then provided to a CHF.

In further detail regarding the LAA case, the PDCP packets are split into RLC segments as noted. The RLC segments are handled by the MAC layer and multiple RLC segments transmitted on the licensed and unlicensed carriers may involve the same PDCP packet(s), which means that they involve the same IP packet(s). It is contemplated herein, at least in some embodiments, that the TMHF in such cases be instantiated at the MAC entity responsible for dividing the RLC segments between the licensed and unlicensed carriers.

In this regard, it should be understood that the control node 30 may be implemented in each one of one or more eNodeBs or other base station 20, and that each such eNodeB or base station 20 may include TMHF capabilities addressing the different traffic split scenarios, such that usage data may be accumulated for splits that occur above the radio protocol stack and for splits that occur at any given level—RLC, MAC, etc.—within the radio protocol stack. These different functional instantiations also enable the eNodeB or other base station 20 to easily accommodate any differences in functionality associated with uplink and downlink traffic splits.

For example, a TMHF function may be configured to differentiate user plane traffic transmitted on the downlink from user traffic transmitted on the uplink, at least in cases where the involved user device 12 is capable of splitting the transmission of uplink data among or between two or more radio accesses 22. In the downlink context involving an example case of WLAN/LTE aggregation, the TMHF can be placed at the PDCP entity routing the packets to the involved WLAN AP, which may be done via the Xw interface if the AP is not co-located. The TMHF may be configured to wait for ACKs from the WLAN AP for PDCP packets routed over the WLAN AP, before the TMHF actually counts those packets in the usage data being accumulated for the WLAN AP. For uplink traffic, the TMHF may be located at the PDCP entity in the eNodeB that receives the uplink packets sent over the different radio accesses 22.

In another aspect of the disclosed teachings, the PCRF node 72 is aware of RAN aggregation being possible in the network 10, and is aware that the network 10 provides or supports the above-described SLRF and TMHF functionalities. Then, at least in instances where differentiated charging is to be used for aggregated radio access for a user traffic flow, the PCRF node 72 indicates to a PCEF node that downlink charging is to be performed based on usage data received from the TMHF. As an alternative, the TMHF or other RAN entity provides an indication to the PCEF that RAN aggregation has been activated and the charging performed by PCEF should be changed based on the usage data accumulated by the TMHF involved in the aggregation. As a further alternative, the information in the PCEF is known either on a device-level or on a bearer-level for a given device 12. This knowledge means that, for example, the usage information from a TMHF to the PCEF node is related to specific bearers that are also aggregated on the RAN-level. More broadly, the use of differentiated charging for aggregated radio accesses and the correspondingly accumulated usage information can be indicated using control-plane signaling, user-plane signaling, or some combination of both, and may use existing or new signaling interfaces between the involved nodes.

Figure 7:
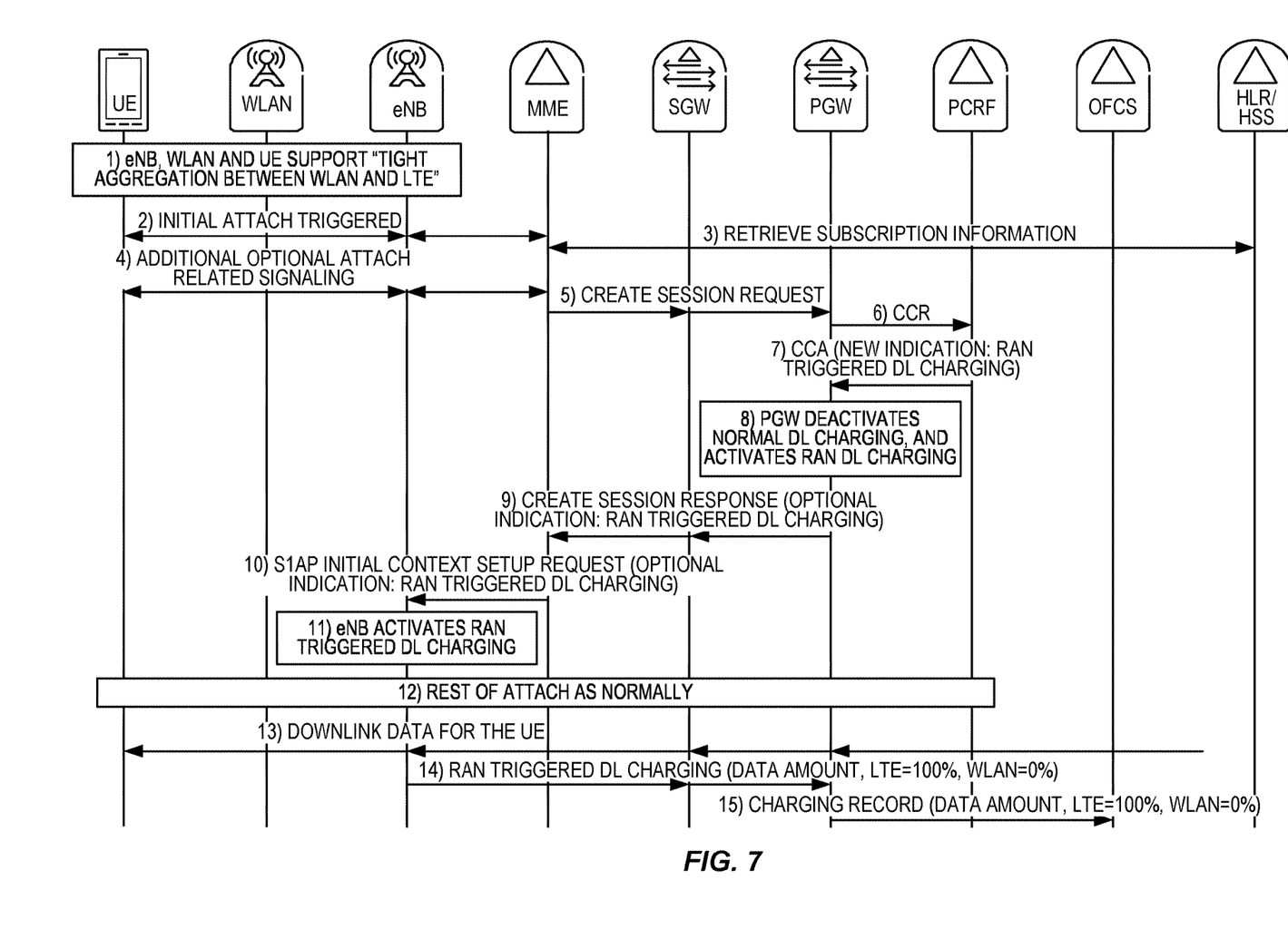
FIGS. 7 and 8 are signal flow diagrams for one embodiment of charging differentiation, for aggregated radio access.

FIG. 7 illustrates an example signaling flow. The illustrated entities include a User Equipment or UE, a WLAN, an eNodeB or eNB, a Mobility Management Entity or MME, a S-GW, a P-GW, a PCRF, an OFCS, and a Home Location Register/Home Subscriber Server or HLR/HSS. The eNB shall be understood as an example of the previously introduced base station 20, the UE shall be understood as an example of the previously introduced user device 12, and the control node 30—e.g., at least the TMHF entity—shall be understood as being incorporated into the eNB.

The starting assumption (Item 1) is that the eNB, WLAN and UE support "tight aggregation" between the WLAN and the LTE RAN in which the eNB operates. Initial attachment between the UE and the eNB occurs (Item 2), which results in the retrieval of subscription information for the UE (Item 3). There may be additional, optional attachment-related signaling (Item 4). In any case, the attachment event results in the MME sending a request to the S-GW to create a session for the UE (Item 5). That signaling is forwarded from the S-GW to the P-GW. The P-GW sends a CCR to the PCRF (Item 6) and receives a Credit Control Acknowledgment or CCA in return (Item 7). Advantageously, the CCA in this example includes an indication that RAN-triggered downlink, DL, charging is to be used for the session.

In response to that indication, the P-GW deactivates its "normal" or default downlink charging mechanism (Item 8), which may track overall traffic amounts for the session/flow, but which does not account for the fact that the overall traffic flow may be divided between or among two or more different radio accesses 22. In conjunction with deactivating its normal, non-differentiated downlink charging function, the P-GW activates RAN-based downlink charging, which is another way of saying that the P-GW will use usage information from the involved TMHF in the RAN, to differentiate charging with respect to the aggregated radio access used in the session/flow.

The P-GW provides a response to the session creation request (Item 9), where that response to the MME may include an indication that RAN-based downlink charging will be used for the session/flow. The MME provides a S1AP initial context setup request to the eNB (Item 10), which request optionally includes an indication that RAN-based downlink charging will be used.

In response, the eNB activates RAN-based downlink charging, also referred to as RAN-triggered downlink charging (Item 11). Attachment processing then proceeds "normally" or as is otherwise known for an existing LTE network (Item 12). At least initially, e.g., before actual aggregation of LTE and WLAN radio links occurs, user traffic is conveyed entirely through the LTE RAN to the UE (Item 13). Consequently, at least for an initial reporting period, the accumulated usage data sent from the eNB to the P-GW (Item 14) indicates the relative data amounts as "LTE=100%" and "WLAN=0%". As such, the P-GW generates a CDR reflecting the fact that 100% of the total traffic for the session/flow was conveyed via the LTE RAN (Item 15). The CDR may be transmitted to the OFCS.

Assuming that the session continues, the traffic split may change, e.g., at least some of the user traffic in the involved user traffic flow may be sent via the WLAN. Correspondingly updated usage information would be sent periodically, or on a triggered basis, from the eNB to the P-GW, to reflect the changing division of user traffic. See, for example, Items 16-21 in FIG. 8, which illustrate a related or continued signaling flow in which the eNB decides to activate tight integration between the WLAN and the LTE network, for a given session/flow, for a given UE. Thus, FIG. 7 can be understood as illustrating a case where the LTE network and its included RAN support aggregated radio access, where charging operations are modified to allow for differentiated charging as taught herein, but where the involved user traffic flow is at least initially not split and instead is carried 100% by the LTE RAN.

Figure 8:
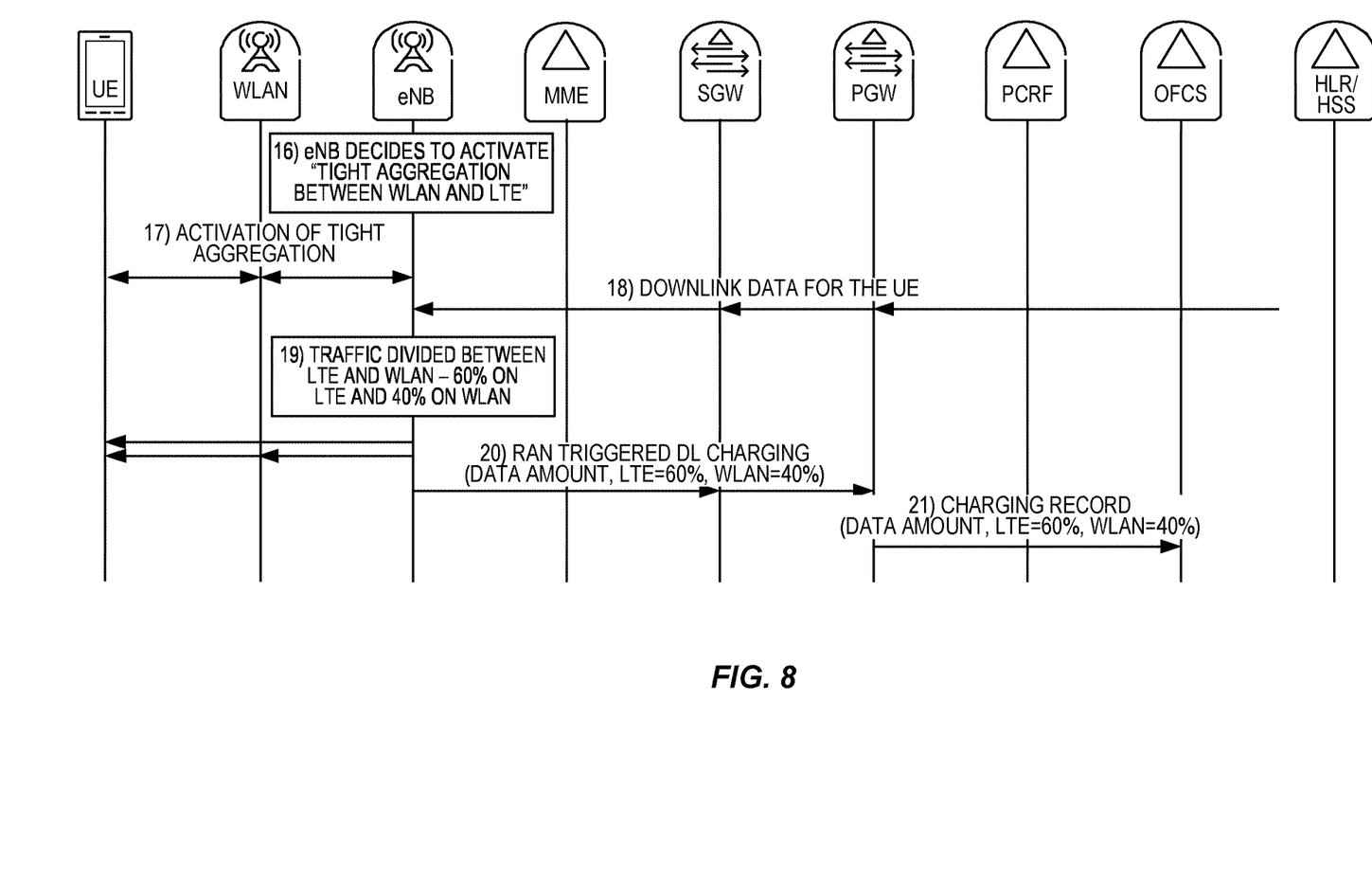

FIG. 8 assumes the same backdrop but illustrates a case where the downlink data flowing for user equipment (Item 18) is divided between the LTE RAN and the WLAN on a 60/40 split, with 60% being carried by the LTE RAN and 40% being carried by the WLAN (Item 19). Correspondingly, the eNB reports corresponding accumulated usage data (Item 20) that reflects the split, and the P-GW generates a CDR that accounts for the split (Item 21). Of course, the eNB may provide updated information at periodic or triggered reporting times, indicating changing split amounts. The reported split amounts may reflect average or min/max values seen over the most recent reporting period, for example.

Figure 9:
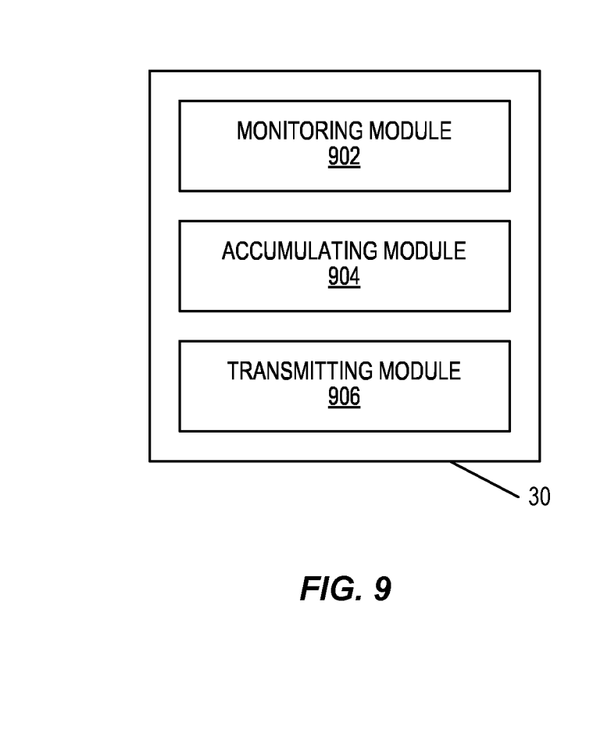
FIG. 9 is a block diagram of one embodiment of processing modules, for a control node arranged to differentiate charging with respect to aggregated radio access.

FIG. 9 is a block diagram of one embodiment of processing modules, for a control node 30 arranged to differentiate charging with respect to aggregated radio access. The modular arrangement is implemented, e.g., based on programmable circuitry being configured to implement the described functions or operations according to the execution of the computer program 38. The illustrated control node 30 comprises a monitoring module 902 configured to monitor a division of user traffic in a user traffic flow for which an aggregated radio access is used, where the aggregated radio access divides the user traffic between two or more different radio accesses 22 used to convey the user traffic between the network 10 and a user device 12. The illustrated control node 30 additionally includes an accumulating module 904 configured to accumulate usage data reflecting the division while the user traffic flow is active, based on the monitoring, and a transmitting module 906 configured to transmit the usage data to a further node in the network 10, via one or more communication interfaces 32 of the control node 30, for use in differentiating charging with respect to the aggregated radio access.

Figure 10:
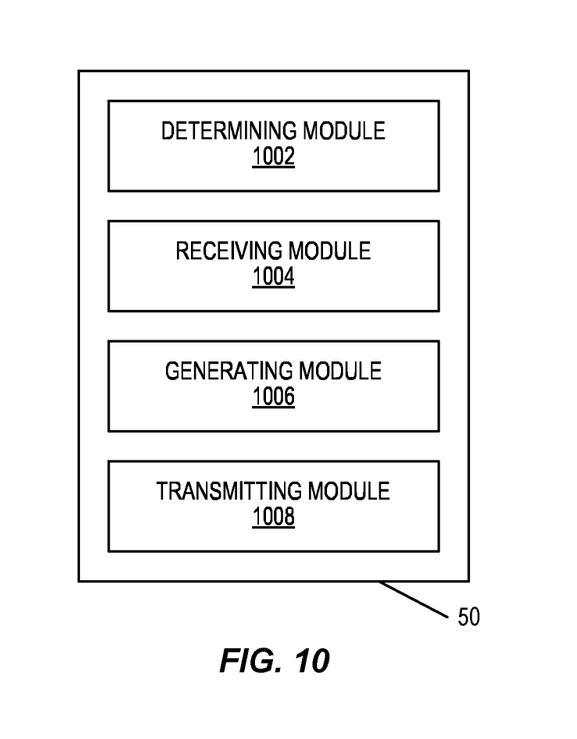
FIG. 10 is a block diagram of one embodiment of processing modules, for a gateway node arranged to differentiate charging with respect to aggregated radio access.

FIG. 10 is a block diagram of one embodiment of processing modules, for a P-GW 50 or other gateway node configured for operation in a wireless communication network and arranged to differentiate charging with respect to aggregated radio access. The modular arrangement is implemented, e.g., based on programmable circuitry being configured to implement the described functions or operations according to the execution of the computer program 58.

The illustrated gateway node comprises a determining module 1002 configured to determine that differentiated charging with respect to an aggregated radio access shall be used for a user traffic flow supported by the gateway node 50, where the aggregated radio access divides user traffic comprising the user traffic flow between two or more different radio accesses 22 connecting the network 10 to a user device 12 associated with the user traffic flow. The node further includes a receiving module 1004 configured to receive usage data accumulated by a control node 30, reflecting the division of the user traffic with respect to the aggregated radio access, a generating module 1006 configured to generate a CDR that differentiates usage with respect to the aggregated radio access, based on the usage data. Still further, the node includes a transmitting module 1008 configured to transmit the CDR to a charging system node 74, via one or more communication interfaces 52 of the gateway node, for use in differentiated billing with respect to the aggregated radio access.

With the above non-limiting examples in mind, the teachings herein disclose methods and apparatuses to support flexible charging where network operators have tight integration/aggregation of multiple radio accesses. Conventionally, such aggregations are transparent to the core network nodes, which denies the network operators the ability to differentiate charging in view of how user traffic is split between or among the different radio accesses 22 used to provide aggregated radio access to a user device 12.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation in a control node configured for operation in a wireless communication network, the method comprising:
monitoring a division of user traffic in a user traffic flow for which an aggregated radio access is used, where the aggregated radio access divides the user traffic between two or more different radio accesses used to convey the user traffic between the wireless communication network and a user device;
accumulating usage data reflecting the division while the user traffic flow is active, based on the monitoring; and
transmitting the usage data to a further node in the wireless communication network, for use in differentiating charging with respect to the aggregated radio access;
wherein the wireless communication network uses an instance of a defined radio protocol stack for exchanging the user traffic with the user device, with at least a portion of the instance of the defined radio protocol stack being shared between the two or more different radio accesses, and wherein monitoring the division of the user traffic in the user traffic flow comprises monitoring the division at a flow processing point within the instance of the defined radio protocol stack.

2. The method of claim 1, wherein the two or more different radio accesses comprise two or more different carriers aggregated to support the aggregated radio access, and wherein monitoring the division of the user traffic comprises monitoring a division of the user traffic between the two or more different carriers.

3. The method of claim 2, wherein the two or more different carriers comprise at least one of:
a first carrier associated with a first Radio Access Technology (RAT) and a second carrier associated with a second RAT different than the first RAT;
a first carrier operated in a licensed radio spectrum associated with the wireless communication network and a second carrier operated in an unlicensed spectrum; and
a first carrier owned or controlled by a first network operator and a second carrier owned or controlled by a second network operator different than the first network operator.

4. The method of claim 1, wherein the control node comprises a base station node operating as a serving base station for the user device and providing at least one of the two or more different radio accesses.

5. The method of claim 1, wherein the instance of the defined radio protocol stack is split at a certain layer with respect to the two more different radio accesses, with the portion of the stack above the split shared by the two or more different radio accesses, and wherein monitoring the division at the flow processing point within the instance of the defined radio protocol stack comprises monitoring at a level of the stack below the split.

6. A control node configured for operation in a wireless communication network, the control node comprising:
one or more communication interfaces configured to exchange signaling with a further node in the wireless communication network; and
processing circuitry operatively associated with the one or more communication interfaces and configured to:
monitor a division of user traffic in a user traffic flow for which an aggregated radio access is used, where the aggregated radio access divides the user traffic between two or more different radio accesses used to convey the user traffic between the wireless communication network and a user device;
accumulate usage data reflecting the division while the user traffic flow is active, based on the monitoring; and
transmit the usage data to the further node, for use in differentiating charging with respect to the aggregated radio access;
wherein the wireless communication network uses an instance of a defined radio protocol stack for exchanging the user traffic with the user device, with at least a portion of the instance of the defined radio protocol stack being shared between the two or more different radio accesses, and wherein the processing circuitry is configured to monitor the division of the user traffic in the user traffic flow by monitoring the division at a flow processing point within the instance of the defined radio protocol stack.

7. The control node of claim 6, wherein the two or more different radio accesses comprise two or more different carriers aggregated to support the aggregated radio access, and wherein the processing circuitry is configured to monitor the division of the user traffic by monitoring a division of the user traffic between the two or more different carriers.

8. The control node of claim 7, wherein the two or more different carriers comprise at least one of:
a first carrier associated with a first Radio Access Technology (RAT) and a second carrier associated with a second RAT different than the first RAT;
a first carrier operated in a licensed radio spectrum associated with the wireless communication network and a second carrier operated in an unlicensed spectrum; and
a first carrier owned or controlled by a first network operator and a second carrier owned or controlled by a second network operator different than the first network operator.

9. The control node of claim 6, wherein the control node comprises a base station node configured for operation as a serving base station for the user device and for providing at least one of the two or more different radio accesses.

10. The control node of claim 6, wherein the user traffic flow comprises an Internet Protocol (IP) packet flow, and wherein the processing circuitry is configured to monitor the division of the user traffic in the user traffic flow by monitoring a division of the IP packets comprising the user traffic flow between the two or more different radio accesses.

11. The control node of claim 6, wherein the instance of the defined radio protocol stack is split at a certain layer with respect to the two more different radio accesses, with the portion of the stack above the split shared by the two or more different radio accesses, and wherein the processing circuitry is configured to monitor the division of the user traffic in the user traffic flow by monitoring at a level of the stack below the split.

12. The control node of claim 6, wherein the wireless communication network comprises a cellular communication network, and wherein a first one of the two or more different radio accesses is a first carrier provided by a radio base station of the cellular communication network, and a second one of the two or more different radio accesses is a second carrier provided by a Wireless Local Access Network (WLAN) access point.

13. The control node of claim 6, wherein the processing circuitry is configured to monitor the division of the user traffic in the user traffic flow by monitoring absolute amounts of the user traffic conveyed via each of the two or more different radio accesses, such that the usage data transmitted to the further node indicates the absolute amounts of the user traffic conveyed via each of the two or more different radio accesses.

14. The control node of claim 6, wherein the processing circuitry is configured to monitor the division of the user traffic in the user traffic flow by monitoring relative amounts of the user traffic conveyed via each of the two or more different radio accesses, such that the usage data transmitted to the further node indicates the relative amounts of the user traffic conveyed via each of the two or more different radio accesses.

15. The control node of claim 6, wherein the processing circuitry is further configured to monitor one or more Quality-of-Service (QoS) parameters for each of the two or more different radio accesses and include an indication of the monitored QoS parameters, or data derived therefrom, in the usage data transmitted to the further node, for further differentiation of charging with respect to the aggregated radio access.

* * * * *